(12) United States Patent
Pickens et al.

(10) Patent No.: US 9,425,632 B2
(45) Date of Patent: *Aug. 23, 2016

(54) UTILITY BAGS WITH BATTERY PACK-TO-UNIVERSAL SERIAL BUS POWER DEVICES

(71) Applicant: Custom LeatherCraft Manuf. Co., Inc., South Gate, CA (US)

(72) Inventors: Ron A. Pickens, Owasso, OK (US); Matthew D. Noble, Los Angeles, CA (US)

(73) Assignee: Custom LeatherCraft Manuf. Co., Inc., South Gate, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 14/266,990

(22) Filed: May 1, 2014

(65) Prior Publication Data

US 2014/0327401 A1 Nov. 6, 2014

Related U.S. Application Data

(60) Provisional application No. 61/818,714, filed on May 2, 2013.

(51) Int. Cl.
*H01M 10/46* (2006.01)
*H02J 7/00* (2006.01)

(52) U.S. Cl.
CPC ....... *H02J 7/0042* (2013.01); *H02J 2007/0062* (2013.01)

(58) Field of Classification Search
CPC .............................. H02J 7/0042; H02J 7/355
USPC .......... 320/107, 111, 114, 115, 127; 150/100, 150/118, 131, 143
See application file for complete search history.

(56) References Cited

U.S. PATENT DOCUMENTS

| | | | | |
|---|---|---|---|---|
| 2012/0262117 A1* | 10/2012 | Ferber | ................... | H02J 7/0047 320/111 |
| 2015/0084578 A1* | 3/2015 | Pickens | ................. | H02J 7/0054 320/103 |
| 2015/0084592 A1* | 3/2015 | Pickens | ................. | H02J 7/0045 320/112 |
| 2015/0084596 A1* | 3/2015 | Pickens | ................... | A45F 5/021 320/127 |
| 2015/0318716 A1* | 11/2015 | Pickens | ................. | H02J 7/0003 320/110 |

* cited by examiner

*Primary Examiner* — Edward Tso

(57) ABSTRACT

One embodiment includes a battery pack receptacle that removably connects to a battery pack used for a cordless device. A universal serial bus (USB) receptacle is connected to the battery pack receptacle. The battery pack is used as a power source for the USB receptacle.

20 Claims, 8 Drawing Sheets

UTILITY BAGS WITH BATTERY PACK-TO-UNIVERSAL SERIAL BUS POWER DEVICES

CROSS-REFERENCE TO RELATED APPLICATIONS

This application claims the priority benefit of U.S. Provisional Patent Application Ser. No. 61/818,714, filed May 2, 2013, incorporated herein by reference in its entirety.

TECHNICAL FIELD

One or more embodiments relate generally to universal serial bus (USB) power, and in particular, use of a tool battery pack as a power source for USB devices for a utility bag or container.

BACKGROUND

Many people use utility bags and luggage for holding items for organization and convenience, and to carry the items from one place to another. Many instances, portable cordless power tools are carried in the utility bags.

SUMMARY

One or more embodiments relate to cordless device battery pack power used for universal serial bus (USB) devices. In one embodiment, an apparatus includes a battery pack receptacle that removably connects to a battery pack used for a cordless device. In one embodiment, a USB receptacle is connected to the battery pack receptacle. The battery pack is used as a power source for the USB receptacle One embodiment provides a system comprising: a utility bag, a battery pack receptacle that is coupled to the utility bag and removably receives a battery pack used for a cordless device, and a USB receptacle coupled to the utility bag. In one embodiment, the USB receptacle is connected to the battery pack receptacle. The battery pack receptacle transfers power from a received battery pack to the USB receptacle.

These and other features, aspects and advantages of the one or more embodiments will become understood with reference to the following description, appended claims and accompanying figures.

BRIEF DESCRIPTION OF THE DRAWINGS

The embodiments are illustrated by way of example, and not by way of limitation, in the Figures of the accompanying drawings and in which like reference numerals refer to similar elements and in which.

DETAILED DESCRIPTION

The following description is made for the purpose of illustrating the general principles of the one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for battery pack receptacles for transferring power from a cordless device battery pack to a USB receptacle for a utility bag, as well as operation and/or component parts thereof. While the following description will be described in terms of cordless device battery pack power for USB devices, for clarity and to place the one or more embodiments in context, it should be kept in mind that the teachings herein may have broad application to all types of systems, devices and applications.

The description may disclose several preferred embodiments of battery pack to USB connections for powering/charging electronic devices, as well as operation and/or component parts thereof. While the following description will be described in terms of battery pack to USB connections for powering/charging electronic devices and systems for clarity and to place the invention in context, it should be kept in mind that the teachings herein may have broad application to all types of systems, devices and applications One or more embodiments relate to cordless device battery pack power used for USB devices. In one embodiment, an apparatus includes a battery pack adapter/receptacle that a battery pack used for a cordless device removably connects to by being placed into the receptacle/adapter. In one embodiment, one or more USB ports are connected to the battery pack receptacle or adapter. The battery pack is used as a power source for the one or more USB connection ports.

One embodiment of the invention includes charging/powering an electronic device that may be employed in multiple housings, such as utility bags, fishing bags, backpacks, duffel bags, tool boxes, tool carriers, sports bags, luggage, emergency services bags, cases, coolers, etc. It should be noted that while utility bags are shown and discussed for housing the embodiments, other housings may also be implemented (e.g., pocket books, fanny packs, stand-alone containers or devices, bucket bags, clothing, etc. In other embodiments, no housing is required and the battery pack receptacle and USB receptacle or port may be integrated into a single component or housing without a utility bag or other container.

Figure 1:
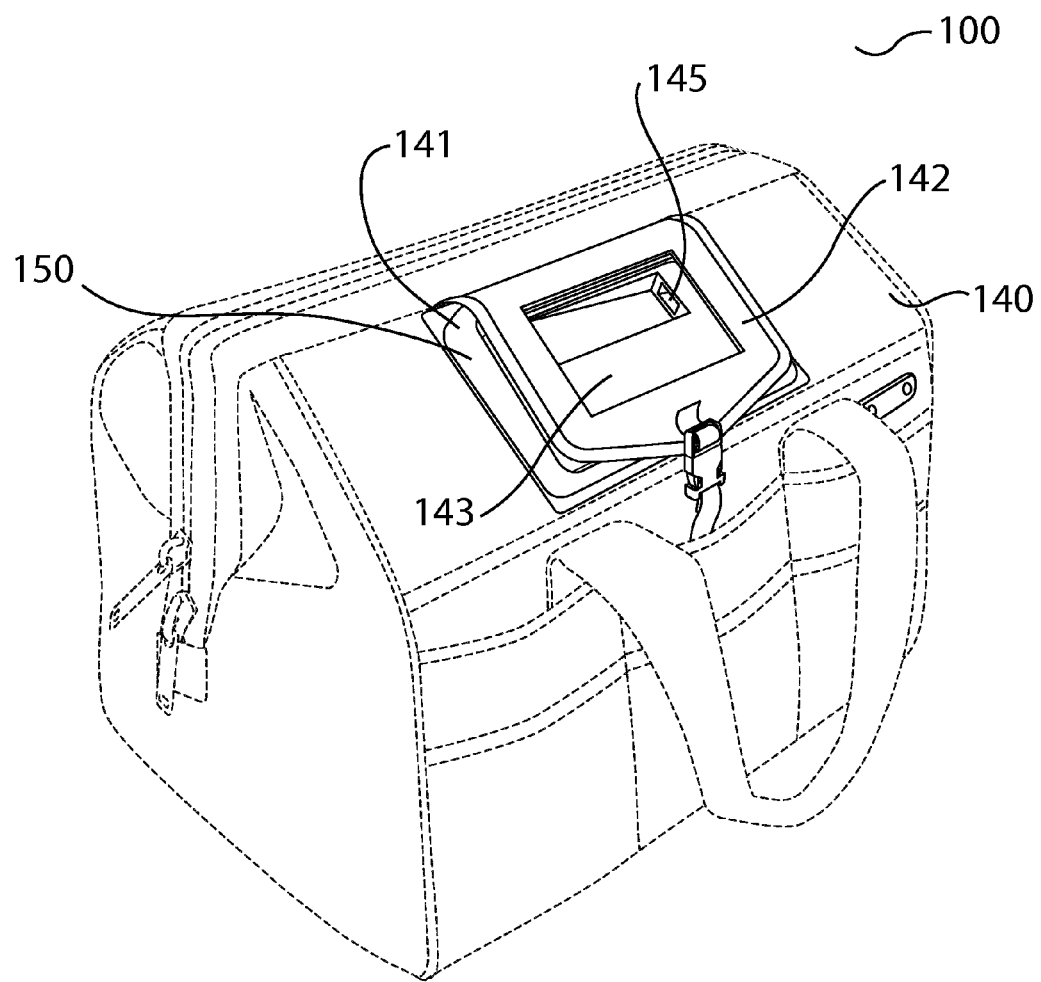
FIG. 1 illustrates a perspective view of an electronic device holder for a charging/powering device showing an example utility bag according to one embodiment.

FIG. 1 illustrates a perspective view of an electronic device platform or holder 150 for a charging/powering device or system 100 showing an example utility bag 140 according to one embodiment. In one embodiment, the electronic device platform or holder 150 includes a cover 142, and a USB port or receptacle 145. In one embodiment, the cover 142 may include a see through window 143 or protective covering.

In one embodiment, the electronic device holder 150 may be a separate formed component that may be integrated into a device, such as utility bags, bags, cases, boxes, coolers, etc. In one embodiment, the electronic device holder 150 may be integrated or molded into a device, such as utility bags, bags, cases, boxes, coolers, etc.

In one embodiment, a utility bag, such as example utility bag 140, may have a surface or platform 141 for placement of the electronic device holder 150. In other embodiments, the electronic device holder 150 may be positioned in a pocket, clipped to a pocket, part of a pocket, positioned inside a utility bag, part of a wall of a utility bag (e.g., a side-wall, an end-wall, etc.), container, case, box, cooler, etc. as desired.

Figure 2:
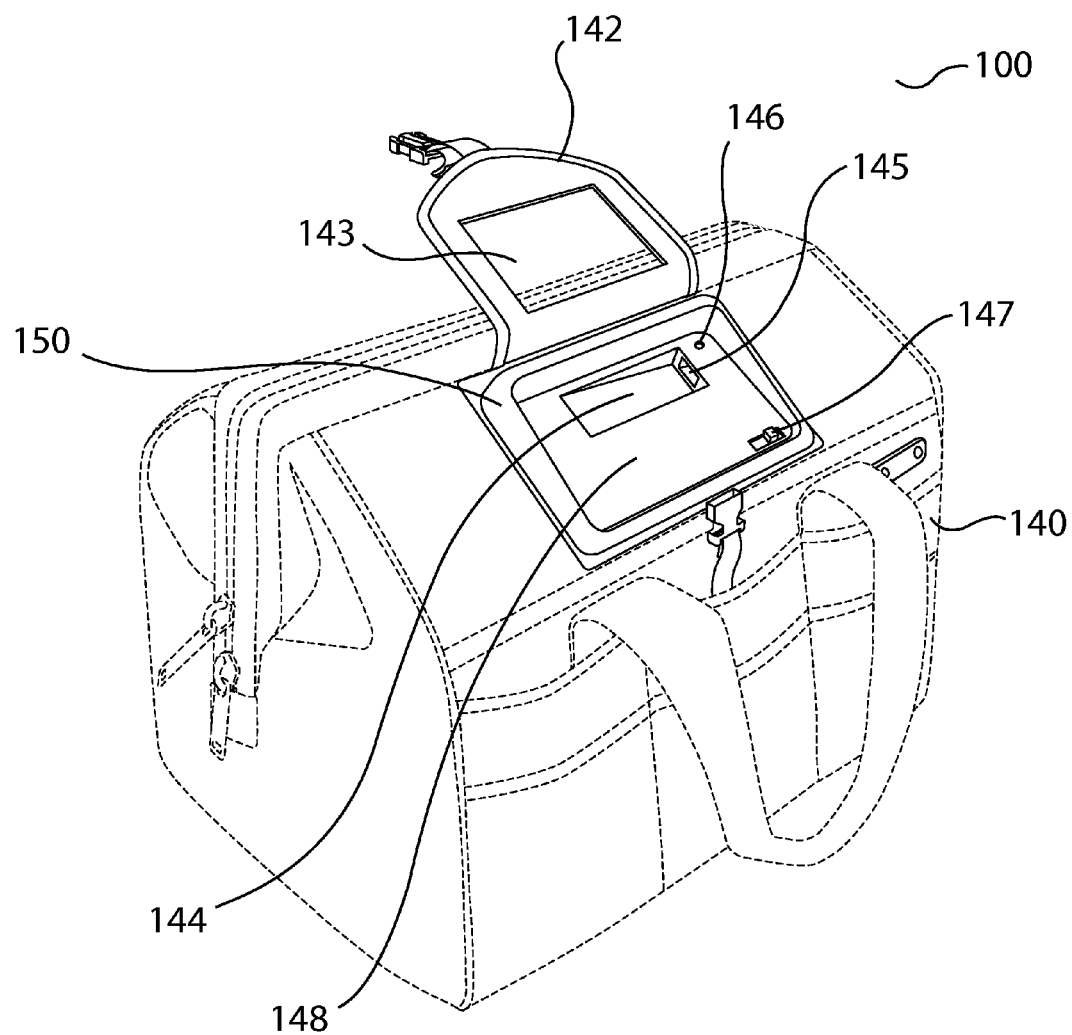
FIG. 2 illustrates a perspective view of an electronic device holder showing a cover opened for a charging/powering device showing an example utility bag according to one embodiment of the invention.

FIG. 2 illustrates a perspective view of an electronic device holder 150 showing a cover 142 opened for a charging/powering system or device 100 showing an example utility bag 140 according to one embodiment. In one embodiment, the electronic device holder 150 includes a USB connector platform or slot 144. In one embodiment, the USB connector platform 144 is angled and has a depth such that a USB connector for an electronic device (e.g., a cell phone, a music player, a pad device, a PDA, GPS device, USB reserve battery, etc.) may be connected to the USB receptacle 145 and placed in the USB connector platform 144 so that upon an electronic device being placed in the electronic device placement portion 148, the USB connector is positioned underneath or out of the way for a flat fitment of the electronic device in the electronic device placement portion 148.

Figure 6:
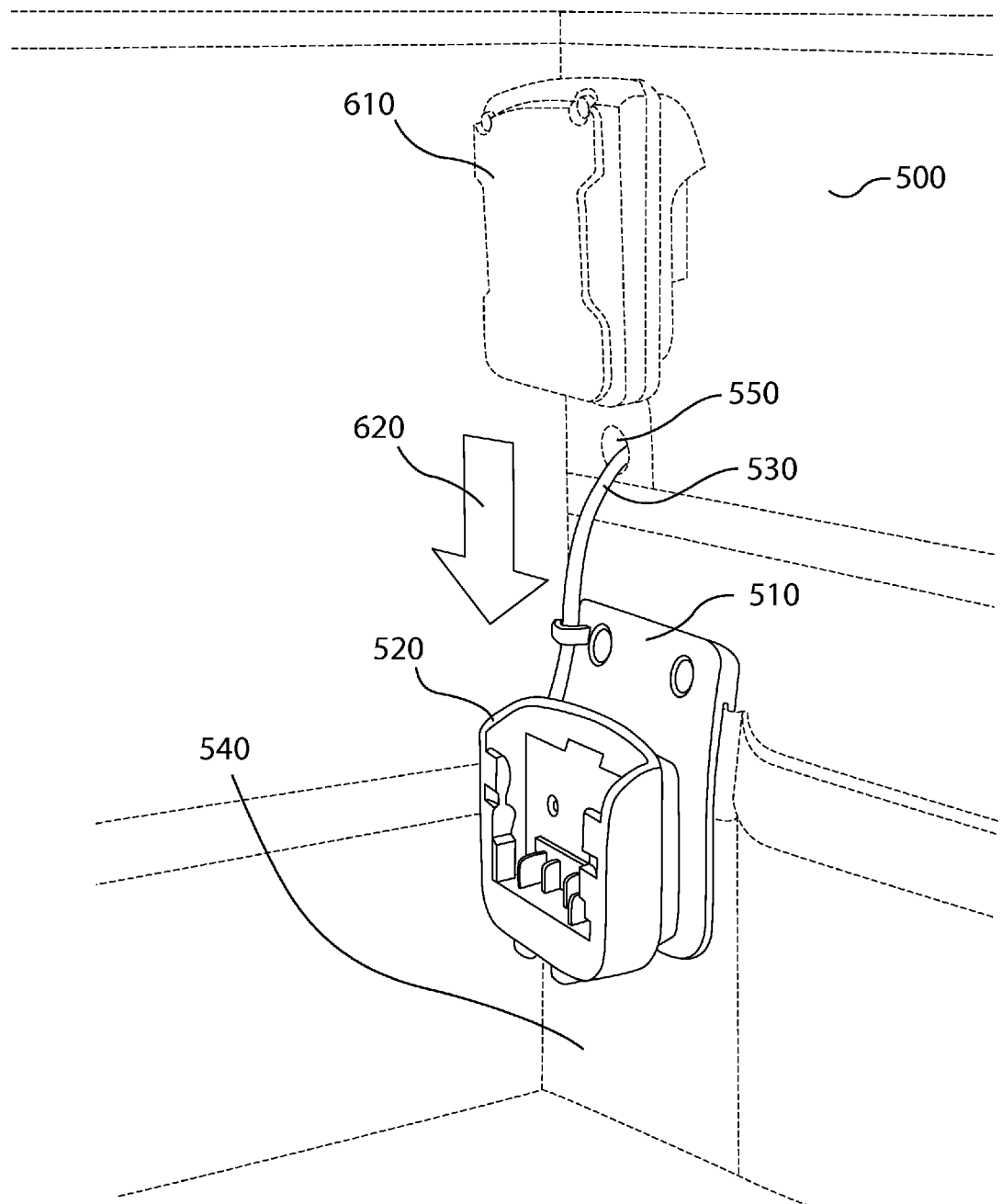
FIG. 6 illustrates an interior view of the charging/powering device showing the battery pack receptacle connected to an example utility bag and showing integrated wiring showing an example battery pack moving in a direction to slide within the receptacle according to one embodiment.

In one embodiment, the charging/powering system or device 100 includes a switch 147 for allowing charging or power to be connected to the USB receptacle 145 from a battery pack, such as a battery pack from a portable tool (e.g., example battery pack 610, FIG. 6). In one embodiment, the switch 147 may be any type of switch, such as a slide switch device, a push button device, a touch device, etc.

In one embodiment, the charging/powering system or device 100 includes an indicator light 146 for indicating information, such as power on/off, type of device connected, etc. In one embodiment, a readout display (not shown) may inform users of percent power remaining from a charging/powering battery pack (e.g., example battery pack 610, FIG. 6), time to recharge, time to replace, etc. In one embodiment, an integrated circuit connected to the USB receptacle 145 and battery pack receptacle 520 (FIG. 5) and provides the aforementioned functions.

Figure 3:
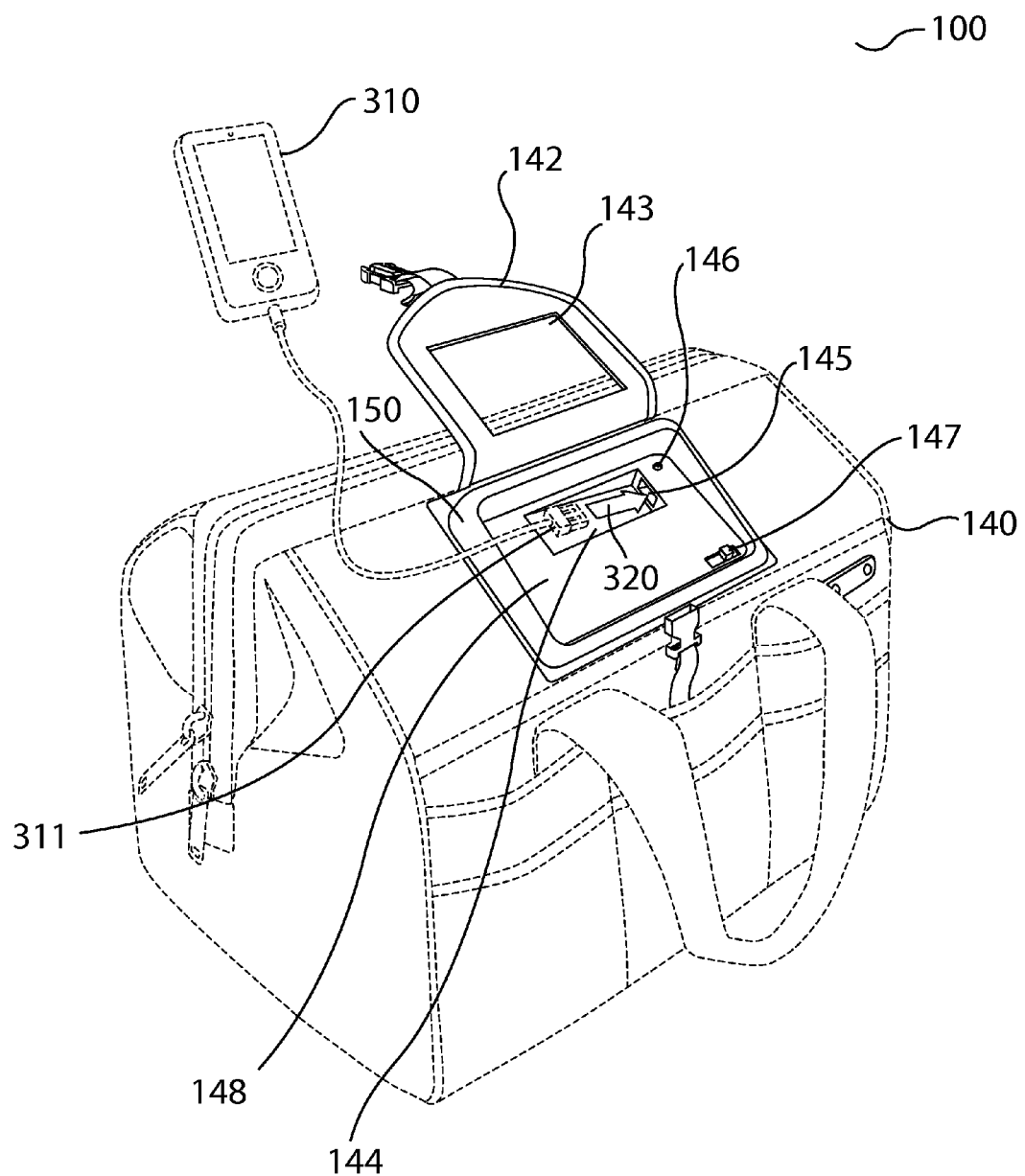
FIG. 3 illustrates a perspective view of an electronic device holder showing a cover opened for a charging/powering device showing an example electronic device and an example utility bag according to one embodiment.

FIG. 3 illustrates a perspective view of an electronic device holder 150 showing a cover 142 opened for the charging/powering system or device 100 showing an example electronic device 310 (e.g., a cell phone) and an example utility bag 140 according to one embodiment. In one embodiment, the USB connector or plug 311 of the example electronic device 310 is slid in the USB connector platform 144 and into the USB receptacle or port 145 in the direction of the arrow 320. In one embodiment, a slot or groove is included on the electronic device placement portion 148 and the electronic device holder 150 for holding and protecting USB wire when the electronic device (e.g., electronic device 310) is used outside of the electronic device holder 150. In another embodiment, a wire placement portion comprises a groove, window/door, slot or area to hold the USB wire for organization and protection while an electronic device is placed within the electronic device holder 150.

Figure 4:
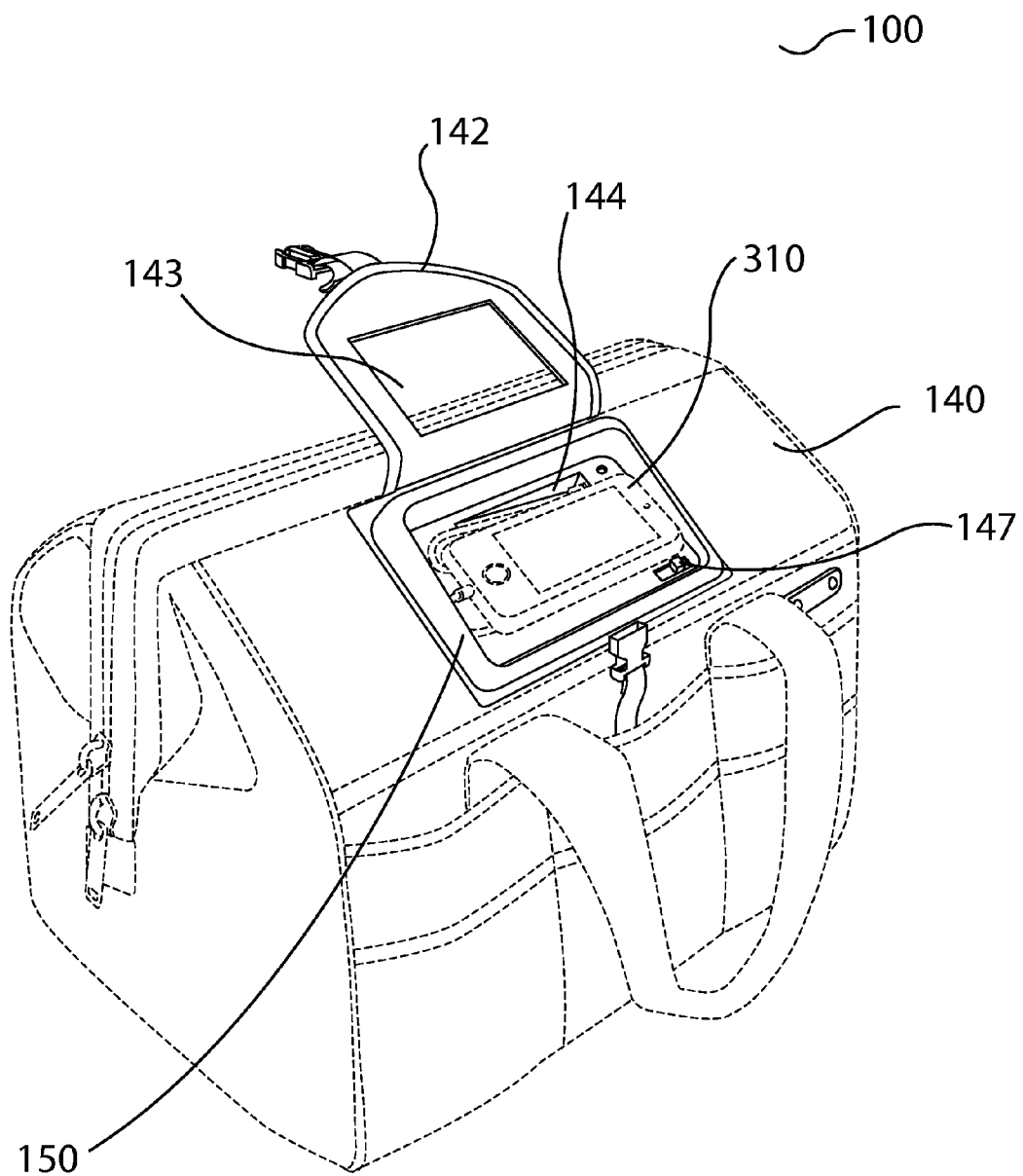
FIG. 4 illustrates a perspective view of an electronic device holder showing a cover opened with an example electronic device placed therein for a charging/powering device showing an example utility bag according to one embodiment.

FIG. 4 illustrates a perspective view of an electronic device holder 150 showing the cover 142 opened with an example electronic device 310 placed therein for the charging/powering system or device 100 showing an example utility bag 140 according to one embodiment. As shown, the example electronic device 310 fits within the electronic device holder 150 and over the USB connector platform 144 for a neat and organized placement of the electronic device 310 and the USB connector 311 and USB wire.

Figure 5:
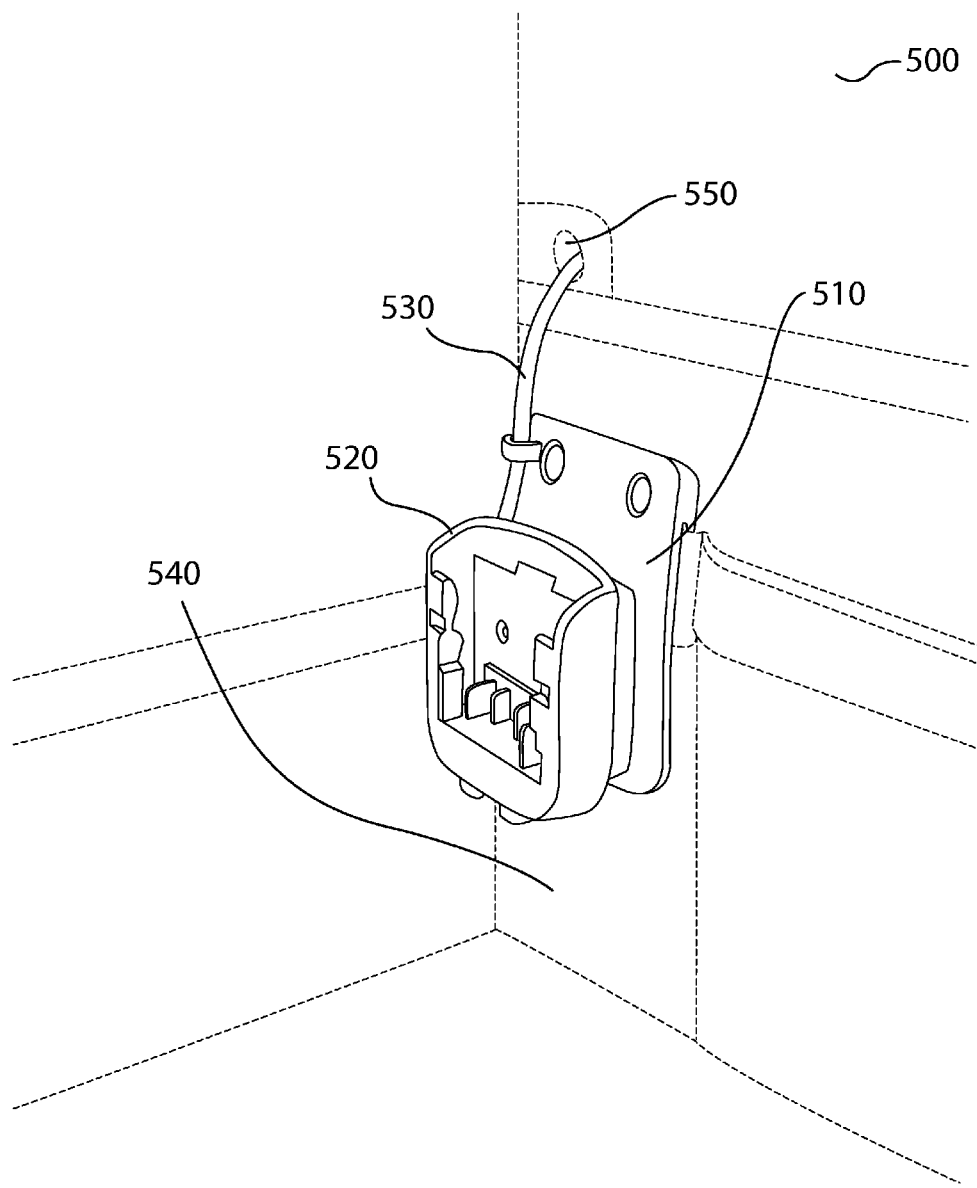
FIG. 5 illustrates an interior view of a charging/powering device showing a battery pack receptacle connected to an example utility bag showing integrated wiring according to one embodiment.

FIG. 5 illustrates an interior view of a battery pack receptacle system 500 showing a battery pack receptacle 520 connected to an example utility bag 140 showing integrated wiring 530 according to one embodiment. In one embodiment, the battery pack receptacle 520 is attached to the interior 540 of an example utility bag. In one embodiment, the battery pack receptacle 520 includes an attachment portion 510 that may be permanently or removably connected to a device, such as example utility bag (e.g., utility bag 140), a box, case, container, sporting bag, rolling bag, luggage, cooler, etc.

In one embodiment, the attachment portion 510 may include a clip or slide portion that fits within a pocket. In one embodiment, the attachment portion 510 may be attached to a utility bag using hook and loop fasteners. In another example embodiment, the attachment portion 510 may be permanently attached to a utility bag, for example, using rivets, nuts and bolts, heat welding, epoxy welding, etc. In another example embodiment, the battery pack receptacle system 500 may be disposed in an internal or external pocket or holding portion of a utility bag.

In one embodiment, the battery pack receptacle 510 may be specific to a manufacturer in order to only fit specific types of battery packs. In other embodiments, the battery pack receptacle 510 may be a universal type of receptacle to fit one or more types of battery packs from one or more manufacturers. In one embodiment, the battery pack receptacle may hold batteries having different types of voltages, such as 12 V., 18 V., 24 V., 36 V., etc. In one embodiment, the charging/powering device 100 includes a circuit that limits voltage/amperage for different types of electronic devices, which may have different power requirements. In one embodiment, the USB receptacle may be used for a USB connector that is plugged into a wall outlet conversion device or computer, etc. for charging the battery pack.

In one embodiment, the charging/powering device 100 and battery pack receptacle system 500 detects the type of device connected to the USB port 145 and may indicate the type of device with specific number of flashes from the indicator light 146. In one embodiment, the wiring 530 may pass from the interior 540 of a utility bag to a power source managing/control circuit or directly to the USB receptacle or port 145 through an opening 550 or protective channel in the utility bag or apparatus.

FIG. 6 illustrates an interior view of the battery pack receptacle system 500 showing the battery pack receptacle 520 connected to the interior 540 of example utility bag 140 and showing integrated wiring 530 showing an example battery pack 610 moving in a direction of arrow 620 to slide or dock within the receptacle 520 according to one embodiment. In one embodiment, the battery pack receptacle is similar to a receptacle for charging battery packs used for cordless devices or tools (e.g., cordless drills, cordless screwdrivers, cordless saws, cordless garden tools, cordless sanders, etc. In one embodiment, the battery pack receptacle 520 includes metal connectors that make contact with contacts of an inserted battery pack (e.g., example battery pack 610) for passing electricity from the battery pack 610 to the battery pack receptacle 520 and through the wire 530 (to the USB receptacle or port 145).

Figure 7:
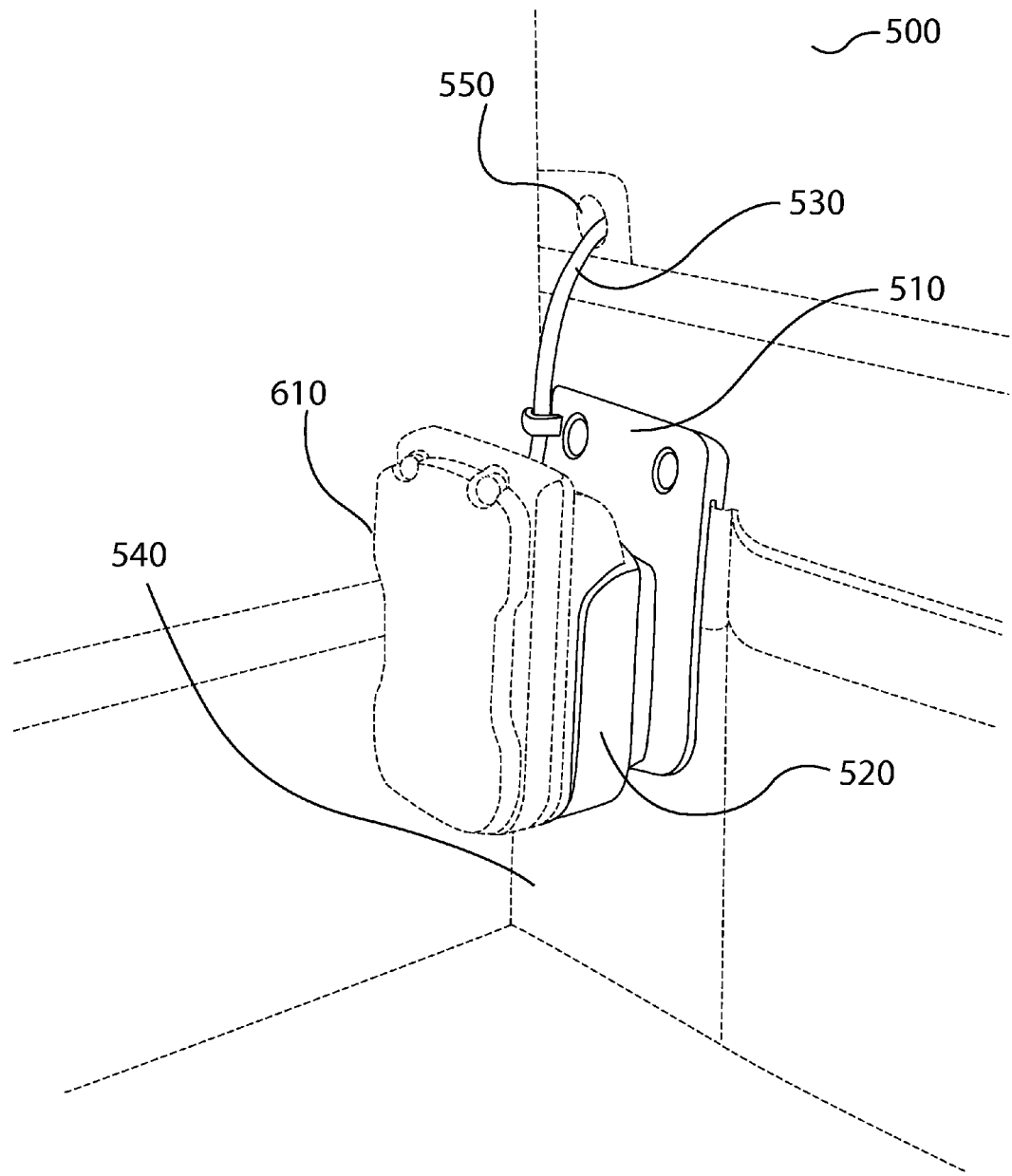
FIG. 7 illustrates an interior view of the charging/powering device showing the battery pack receptacle connected to an example utility bag showing integrated wiring and showing an example battery pack connected within the receptacle according to one embodiment.

FIG. 7 illustrates an interior view of the battery pack receptacle device or system 500 showing the battery pack receptacle 520 connected to the interior 540 of an example utility bag 140 showing integrated wiring 530 and showing an example battery pack 610 connected within the receptacle 520 according to one embodiment. In one embodiment, the battery pack attachment portion 510 is movable to multiple connection portions of the interior portion 540 of the utility bag in order to fit different sized battery packs. In one embodiment, the battery pack receptacle 520 includes multiple sized slots/grooves and multiple placed electrical connectors for fitment of different battery pack sizes and or battery packs of different voltages.

Figure 8:
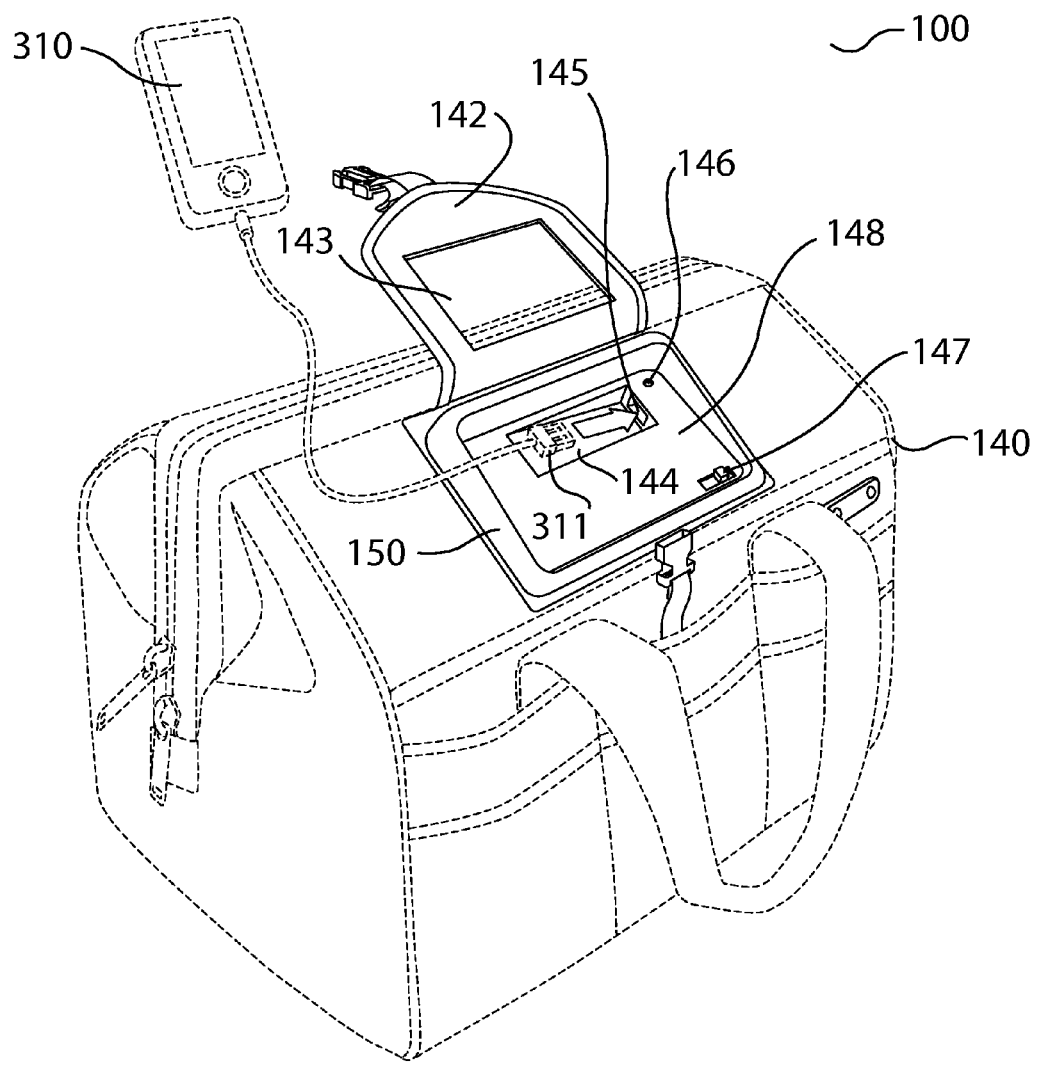
FIG. 8 illustrates a perspective view of an electronic device holder showing a cover opened with an example electronic device being connected to a USB receptacle for and showing an example utility bag according to one embodiment.

FIG. 8 illustrates a perspective view of the electronic device holder 100 showing a cover 142 opened with an example electronic device 310 being connected to a USB receptacle 145 via a USB cord and connector 311 for and showing an example utility bag 140 according to one embodiment. In one embodiment, the electronic device platform or holder 150 and/or the battery pack receptacle 520 and respective components may be made of one or more of: ABS, reinforced polypropylene, polypropylene, high-density polyethylene, nylon material, hardened plastic, polymer, rubber, composite material, metal or metal alloy, etc., carbon fiber, fiberglass, or other similar or equivalent materials.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

In the description above, numerous specific details are set forth. However, it is understood that embodiments may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "embodiment," one "embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   a battery pack receptacle that removably couples to a battery pack used for a cordless device; and
   a universal serial bus (USB) receptacle that is coupled to the battery pack receptacle, wherein the battery pack is used as a power source for the USB receptacle.

2. The apparatus of claim 1, wherein the battery pack receptacle is coupled to a utility bag.

3. The apparatus of claim 1, wherein the USB receptacle is disposed in an electronic device platform that receives an electronic device for placement on the electronic device platform.

4. The apparatus of claim 3, wherein the battery pack receptacle is wired to the USB receptacle.

5. The apparatus of claim 4, further comprising a switch device coupled to the battery pack receptacle and the USB receptacle, wherein the switch device controls an electrical connection between the battery pack receptacle and the USB receptacle.

6. The apparatus of claim 4, wherein the electronic device platform is integrated with the utility bag.

7. The apparatus of claim 6, wherein a wire connecting the battery pack receptacle to the USB receptacle passes through an opening in the utility bag for concealing the wire within the utility bag.

8. The apparatus of claim 6, wherein the electronic device platform includes a removable protective cover.

9. The apparatus of claim 7, wherein the removable protective cover comprises a window.

10. The apparatus of claim 9, further comprising a USB connector platform, wherein the USB receptacle is integrated with the USB connector platform.

11. The apparatus of claim 10, wherein the USB connector platform is angled and disposed underneath the electronic device platform.

12. The apparatus of claim 7, wherein the utility bag comprises one of: a sporting bag, a fishing bag, a luggage container, a backpack, a duffle bag, a tool bag, emergency services bag, a cooler, and a camping bag.

13. The apparatus of claim 12, wherein the battery pack receptacle is disposed in one of an interior of the utility bag or a protective pocket of the utility bag.

14. A system comprising:
    a utility bag;
    a battery pack receptacle that is coupled to the utility bag and removably receives a battery pack used for a cordless device; and
    a universal serial bus (USB) receptacle coupled to the utility bag, the USB receptacle is connected to the battery pack receptacle, wherein the battery pack receptacle transfers power from the received battery pack to the USB receptacle.

15. The system of claim 14, wherein the USB receptacle is disposed in an electronic device platform that receives an electronic device for placement on the electronic device platform.

16. The system of claim 15, further comprising a switch device coupled to the battery pack receptacle and the USB receptacle, wherein the switch device controls an electrical connection between the battery pack receptacle and the USB receptacle.

17. The system of claim 14, wherein the electronic device platform is integrated with the utility bag, and a wire connecting the battery pack receptacle to the USB receptacle passes through an opening in the utility bag for concealing the wire within the utility bag.

18. The system of claim 16, wherein the electronic device platform includes a removable protective cover, and the removable protective cover comprises a window.

19. The system of claim 18, further comprising a USB connector platform, wherein the USB receptacle is integrated with the USB connector platform, and the USB connector platform is angled and disposed underneath the electronic device platform.

20. The system of claim 17, wherein the utility bag comprises one of: a sporting bag, a fishing bag, a luggage container, a backpack, a duffle bag, a tool bag, emergency services bag, a cooler, and a camping bag, and wherein the battery pack receptacle is disposed in one of an interior of the utility bag or a protective pocket of the utility bag.

* * * * *